United States Patent [19]

Mattimoe et al.

[11] 4,059,469
[45] Nov. 22, 1977

[54] GLAZING UNITS, METHODS OF MAKING THE SAME AND ADHESION PROMOTERS THEREFOR

[75] Inventors: Paul T. Mattimoe, Toledo; Theodore J. Motter, Genoa; John J. Hofmann; Siegfried H. Herliczek, both of Toledo, all of Ohio

[73] Assignee: Libbey-Owens-Ford Company, Toledo, Ohio

[21] Appl. No.: 646,464

[22] Filed: Jan. 5, 1976

Related U.S. Application Data

[63] Continuation-in-part of Ser. No. 438,659, Feb. 1, 1974, abandoned, which is a continuation-in-part of Ser. No. 284,137, Aug. 28, 1972, abandoned.

[51] Int. Cl.² .................... B32B 9/04; B32B 13/04
[52] U.S. Cl. .................... 156/108; 156/329; 156/330; 428/213; 428/215; 428/220; 428/339; 428/411; 428/415; 428/421; 428/425; 428/437; 428/441; 428/442; 428/446; 428/447; 428/448; 428/451; 428/480; 428/483; 428/524

[58] Field of Search ............ 428/414, 415, 417, 421, 428/437, 446, 447, 448, 451, 480, 483, 524, 426, 213, 215, 220, 411, 425, 441, 442, 339; 156/108, 329, 330

[56] References Cited

U.S. PATENT DOCUMENTS 3,708,386 1/1973 Alexander ........................ 428/437

Primary Examiner—Marion E. McCamish
Attorney, Agent, or Firm—Collins, Oberlin & Darr

[57] ABSTRACT

An automobile glazing structure that includes at least one sheet of glass, that incorporates a multi-layer protective laceration inhibiting shield bonded to its inboard glass surface to present an exposed inboard surface, and that has areas of at least one surface of a layer of the shield treated with the reaction product of a film forming resin and a compound capable of hydrolysis followed by condensation as an adhesion promoting primer.

11 Claims, 5 Drawing Figures

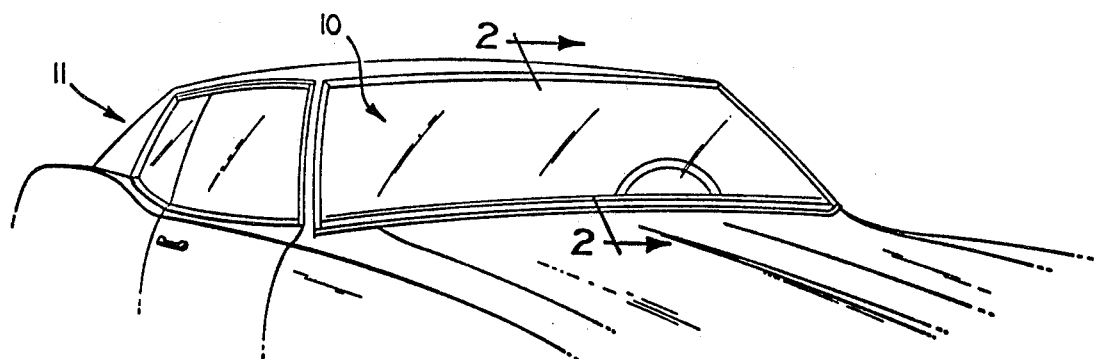
FIG. 1
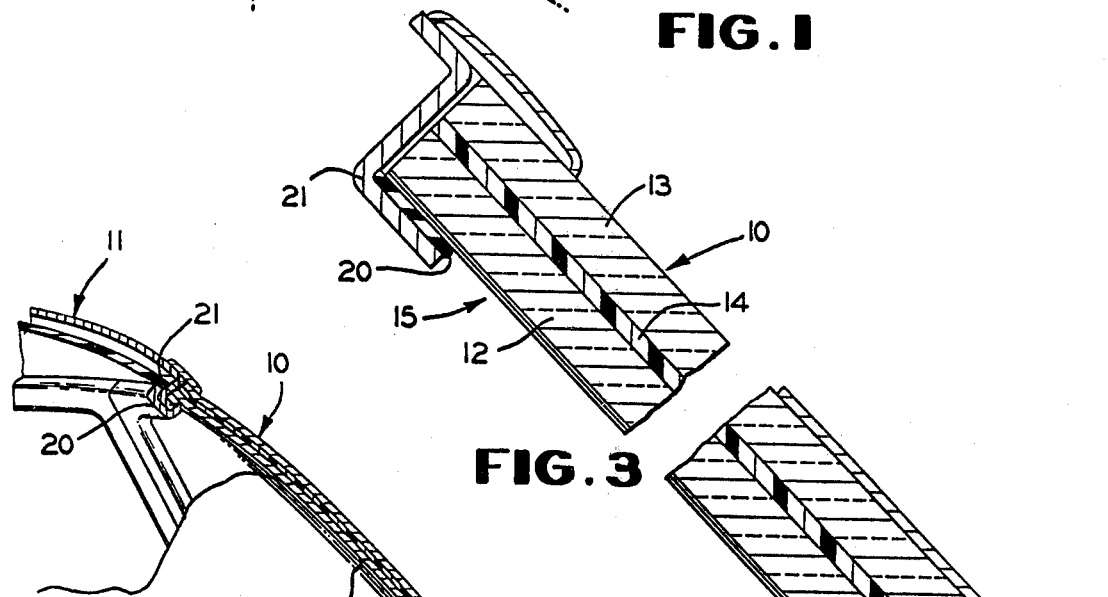
FIG. 3
FIG. 2
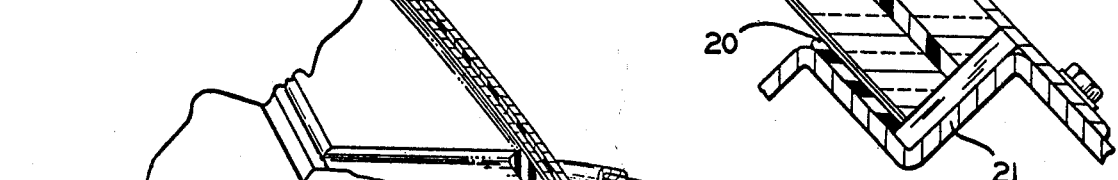
FIG. 5
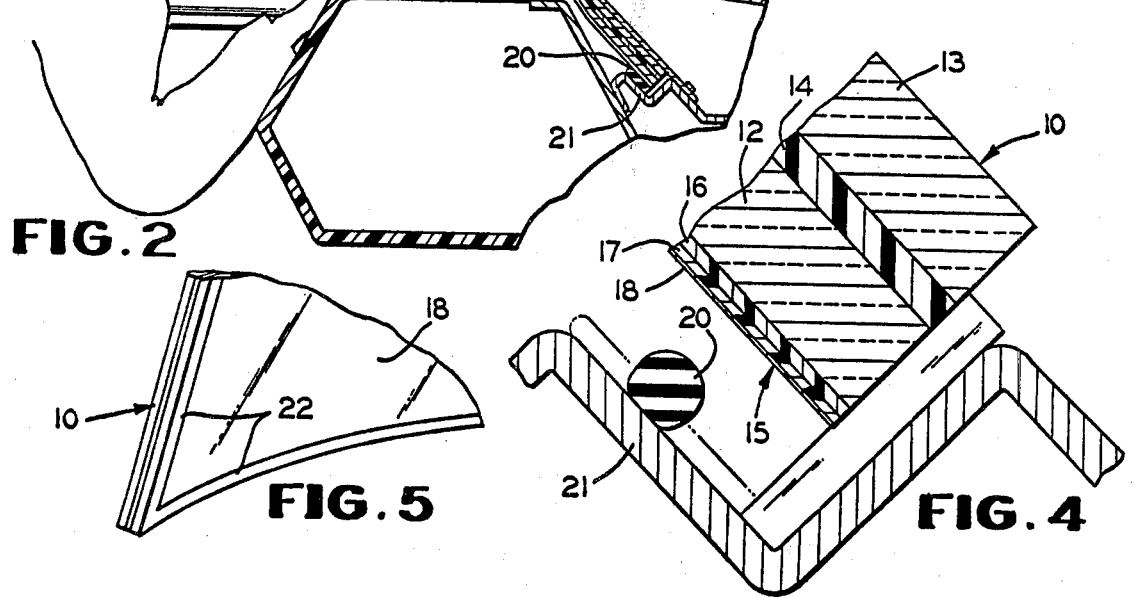
FIG. 4

GLAZING UNITS, METHODS OF MAKING THE SAME AND ADHESION PROMOTERS THEREFOR

This application is a continuation-in-part of our copending application Ser. No. 438,659, filed Feb. 1, 1974, and now abandoned, and which, in turn is a conntinuation-in-part of application Ser. No. 284,137, filed Aug. 28, 1972, and now abandoned.

BACKGROUND OF THE INVENTION

1. Field of the Invention

The present invention relates broadly to automotive glazings. More particularly it has to do with improved structures of this general character that possess unusual safety properties, and with the treatment of such structures to make them acceptable for use as automobile windows and windshields.

2. Description of the Prior Art

In the early stages of the automobile industry, single sheets of ordinary glass were employed as windshields. These were followed, as it became evident that the windshields presented a considerable safety hazard, by single sheets of heat treated or tempered glass, which are still used in some foreign countries. Thereafter, as laminated safety glass was developed, it began to be widely employed for automotive glazing until, ultimately, its contribution as a safety feature became so well recognized that its use became universal in the windshields of automobiles to be driven anywhere in the United States.

Nevertheless, even when glazed with the high quality laminated glass that is presently in use, automobile windows and windshields continue to present a hazard to drivers and front seat passengers, in terms of possible penetration and lacerative injuries, even at relatively low car and impact speeds.

Consequently, with the ever growing recognition of the necessity for increased safety precautions, continuing efforts have been and are still being made to appreciably reduce the injury producing potential of glass containing automobile glazings.

However, in some instances, the factors relied upon for increased safety have raised new problems in employing the improved glazing in the regular commercial production of automobiles.

SUMMARY OF THE INVENTION the present invention is an outgrowth of the discovery that the safety factor of any of the currently used or previously known window or windshield structures containing glass can be notably improved by incorporating into them a special type of what may be termed a protective, laceration inhibiting shield or covering of plastic on and over their inboard glass surfaces.

This improvement can be embodied in a simple glazing structure that involves only one sheet of glass, and by applying a simmple laceration inhibiting cover to the inboard glass surface, or additional advantages of it can be obtained in more sophisticated structures.

However merely providing an adequately protective covering, which when incorporated into a standard window or windshield will enable the structure to meet greatly expanded safety requirements, is not enough to provide a commercially acceptable automotive glazing, because there are a considerable number of other equally important, and generally conflicting requirements that must also be met.

For example, many plastic sheetings that possess suitable protective properties have surfaces that are quite easily and adversely affected by atmospheric conditions. Another problem is that otherwise acceptable plastic sheetings may be susceptible to more or less permanent "denting" or "marking" with any relatively sharp or pointed implement.

Additionally, the plastic sheeting used must be capable of surviving the so-called "cold test" which determines the thermomechanical stability of laminated structures. Observable birefringence color under partially polarized light must also be avoided, and a sutiable plastic sheeting must attain an acceptable Severity Index which is a factor that has become identified with relative safety of automobile windshields.

Finally, while there are any number of adhesives that will secure plastic to glass, most of them will also create serious optical problems if employed in a windshield; and the particular kind of plastic sheeting employed in the protective laceration inhibiting cover or shield may have poor adhesion to the particular polysulfide sealant or adhesive commonly used in mounting windows and windshields in automobiles.

Accordingly, it is a primary object of this invention to provide a commercially acceptable automobile windshield or window that has incorporated into its structure a protective cover or shield of plastic over its inboard glass surface which, in addition to inhibiting lacerative injuries, is not adversely affected by exposure to the atmosphere or by extreme cold, is practically color free, does not adversely affect the Severity Index of the structure, is resistant to marking, scratching, marring and abrasion, and is compatible with and adheres tightly to the conventional and preferred sealing and/or adhesive materials used to mount windows and windshields in automobiles.

Further objects and advantages of the invention will become apparent during the course of the following description, when taken in connection with the accompanying drawings.

BRIEF DESCRIPTION OF THE DRAWINGS

In the drawings, wherein like numerals are employed to designate like parts throughout:

FIG. 1 is a persepctive view of the window and windshield area of an automobile that is equipped with the improved laceration shiled of this invention;

FIG. 2 is a vertical sectional view through the front seat area, taken substantially along the line 2—2 in FIG. 1, and showing the windshield under impact of a person being thrown against it;

FIG. 3 is a vertical sectional view, also taken substantially along the line 2—2 in FIG. 1, and showing, on an enlarged scale, the top and bottom of the windshield in its supporting structure;

FIG. 4 is a fragmentary view, similar to the lower part of FIG. 3, but still further enlarged, and illustrating the position of the windshield just prior to its being pushed into its supporting frame and against a ring of polysulfide sealing material therein; and FIG. 5 is a perspective view of one corner of a windshield the laceration shield of which has had its margins treated with the adhesion promoting material of the invention preparatory to being mounted in an automobile.

DESCRIPTION OF PREFERRED EMBODIMENTS

As illustrated in FIG. 1 a windshield 10 of the invention can be mounted in an automobile 11, and will appear therein like an ordinary windshield of standard construction. Moreover, as shown in FIG. 3, it may be made up, again like an ordinary laminated windshield, of two sheets of glass 12 and 13 bonded together, under heat and pressure and in the conventional manner, by an interposed layer of plastic 14. Indeed, in a preferred embodiment, the plastic interlayer 14 is a 0.030 inch thick sheet of the high penetration resistant polyvinyl butyral disclosed in U.S. Pat. No. 3,231,461 and that is conventionally used for the purpose in existing currently produced windshields.

However, in this preferred form, the windshield 10 differs importantly from previously accepted standard windshields, first, by the fact that the glass sheets 12 and 13 are preferably sheets of float glass, in thicknesses that may be as low as 0.085 inches but no greater than 0.110 inches, bonded to the relatively low adhesion, high penetration resistant interlayer 14 with the "bath" surfaces out as described in U.S. Pat. No. 3,708,386; second, by the provision of a protective laceration inhibiting cover 15 bonded to the inboard surface of the inboard sheet of glass 12; and, third, by the fact that the margins of the exposed surface of the cover 15 are treated with an adhesive promoting agent.

As indicated above, a protective interior cover as contemplated by this invention can be effectively employed with a variety of basic windshields and, indeed, of other automotive glazing structures which may be of either the single or multiple glass sheet type. Also the sheets or layers of glass in the structures may be of thicknesses that vary anywhere from approximately 0.040 inches up to ⅛ and beyond; and the plastic interlayer thicknesses in the laminated structures may vary between 0.015 inches and 0.060 inches.

Similaly, the protective plastic covering of the invention can be a single layer structure in its simpler forms, and a more or less complicated multi-layer one in its more sophisticated embodiments. For example, the preferred form of protective covering or shield that is shown in detail in FIG. 4 is especially well adapted for use with the laminated 0.100 inch thick float glass and 0.030 inch plastic interlayer windshield structure of the illustrated embodiment, but would also be effective for its primary purpose if used with a single sheet of tempered or other glass, or with a different laminated configuration, as the basic structure.

Specifically, the shield 15 of FIG. 4 comprises an approximately 0.015 inch thick layer 16 of a relatively soft, extensible plastic material such as polyvinyl butyral, which is adhered to the inboard surface of the inboard sheet of glass 12; an approximately 8 mil (0.008 inch) thick layer 17 of a more durable plastic such as a polyethylene terephthalate of the character sold by du Pont under the trademark "Mylar"; and a 4 micron thick coating or layer 18 of a more abrasion resistant plastic material which may be a combination of polysilicic acid and copolymers of fluorinated monomers with compounds containing hydroxyl groups such as described in U.S. Pat. No. 3,476,827 and as sold by du Pont under the trademark "Abciter." More specifically they may be a combination of polysilicic acid and copolymers of fluorinated monomers, with compounds containing primary alcohols (as described in U.S. Pat. No. 3,429,845), or with compounds containing secondary alcohols (as described in U.S. Pat. No. 3,429,846). Other abrasion resistant coating materials suitable for the purpose are described in U.S. Pat. Nos. 3,390,203; 3,514,425; and 3,546,318.

In this particular construction, the layer 16 may be said to function primarily as an adhesive, but it also acts to cushion impact and, because of its elasticity and extensibility, to assist in resisting penetration by the head of a driver or passsenger that may be thrown against the windshield.

The layer 17, with its greater durability, functions to protect the softer and less durable layer 16 and can provide a weathering resistant surface. In attempting to meet the requirements for a plastic sheet that is free from objectionable color, streaks and lines, the du Pont company developed a new method of producing their "Mylar" (polyethylene terephthalate) sheeting which involves either stretching it in one direction only or unbalanced biaxial stretching. This overcame the birefringence color problem in the sheeting, but it also made it a fibrillating film and susceptible to splitting in the direction of greatest stretch. Surprisingly enough however when such a unilaterally or unbalanced bilaterally stretched plastic sheeting is employed as the layer 17 and particularly when it is arranged with its major axis of stretch substantially vertical or at right angles to the width or horizontal dimension of the windshield, the splitting or tearing of layer 17 in one direction under high speed impacts, releases its resistance to the larger forces of such impacts and gives notably improved laceration protection.

The plastic in the layer 17 may be in thicknesses of from ½ to 14 mils and, in lieu of the polyethylene terephthalate, other plastic materials including other terephthalate esters, polyurethanes, cellulose esters, acrylics, and polyvinyl fluorides may be employed.

Whatever the material, however, the matter of the thickness of the protective plastic cover 15 is significant and, to provide sufficient "body" to avoid marking, the layer 17 alone of the protective cover should preferably be between about 5 and 10 mils thick. At the same time, to insure adequate balance, and a Severity Index within the acceptable range, the combined thickness of the interlayer 14 and the adhesive layer 16 in the windshield 10 preferably should not exceed 0.065 inches, and the combined thicknesses of layers 14, 16 and 17 should preferably not exceed 0.075 inches. Both of the inner layers 16 and 17 of the shield are non-lacerative, i.e., they will not cut or tear the skin even when an impact occurs that is of sufficient magnitude to penetrate the multi-layer plastic shield; and, finally, the exposed layer 18 presents a surface hard enough to resist wear, weathering and other abuse without itself constituting a lacerative hazard.

Adequate adhesion of the layer 17 to the layers 16 and 18, when the former is polyethylene terephthalate, can be assured by subjecting it to a surface conditioning treatment which may be carried out electrically or chemically, but is preferably done by direct contact with a gas flame for a length of time sufficient to alter the surface characteristics but not the bulk properties of the material.

However the combination of polysilicic acid and copolymers of fluorinated monomers with compounds containing hydroxyl groups of the layer 18 are relatively nonadhereable to the polysulfide adhesive material with which automotive windshields are usually sealed into their frames. Indeed, fluorinated hydrocarbon polymers generally are non adherent to most sealants and, in accordance with this invention, the margins of the layer 18 are treated or primed with a particular kind of adhesion promoter in a manner and for reasons to be more fully hereinafter set forth.

As indicated, the above described embodiments are preferred forms of the laceration shield with which this invention is concerned. However, so long as a protective plastic covering structure possesses the required properties, its particular composition and/or physical make-up can be varied considerably, and may incorporate a variety of plastic materials in a single or multiple layer structure. Similarly, a three or other multilayer shield may be applied to the inboard glass sheet as individual layers, as a combination of multiple and individually layered sheets, or as a single multiple layered sheet. Thus, in lieu of polyvinyl butyral, other relatively high adhesion plastics, with similar properties and including ionomer resin, polyurethane and polyvinyl chloride can be employed as the layer 16 in a three layer shield; and hydrolysis and condensation products of a silane, and/or mixtures of hydrolysis and condensation products of a silane and polysilicic acid can be used as the layer 18.

EXAMPLE

The particular windshield 10 shown in FIGS. 3 and 4 was produced by first assembling two 0.100 inch thick sheets of float glass 12 and 13, that had previously been bent to the desired contour with an interposed 0.030 inch thick sheet 14 of properly plasticized, relatively low adhesion, polyvinyl butyral. Next, applying to the inboard glass sheet 12 a 0.015 inch thick sheet of plasticized, relatively high adhesion, polyvinyl butyral 16 such as described in U.S. Pat. No. 3,708,386, and an 8 mils thick sheet of polyethylene terephthalate 17 precoated with a 4 micron thick layer 18 of a mixture of polysilicic acid and copolymers of fluorinated monomers with compounds containing secondary alcohol groups as described in U.S. Pat. No. 3,429,846.

A cover sheet of bent glass was then placed over the applied sheets 16 and 17–18 after which the layers 12, 14, 13, 16 and 17–18 were bonded together into a unitary structure by subjecting the complete assembly as described above to a pressure of 275 pounds per square inch at a temperature of 300° F. for 10 minutes. The glass cover sheet was then removed, leaving the complete laminated windshield.

The precoated sheet 17 employed in this example was obtained from E. I. duPont de Nemours & Company, Incorporated and said by them to be polyethylene terephthalate film stretched in a special manufacturing process to render it substantially free of observable color fringes upon viewing in partially polarized light and provided with an abrasion resistant coating of the material available under their trademark "Abcite", and understood to be a mixture of polysilicic acid copolymers of fluorinated monomers with compounds containing secondary alcohol groups, on one surface; and was assembled in this example with its coated side exposed and with what was understood to be its major axis of orientation or stretch at substantially right angles to what was to become the width or longitudinal dimension of the windshield.

Windshield structures produced in accordance with the above Example successfully passed all of the established tests for commercially acceptable automobile windshields and, in addition, provided laceration protection at impact speeds of 40 and 45 miles per hour.

Moreover, the wear and scratch resistant layer or coating 18, of the mixture of polysilicic acid and copolymers of fluorinated monomers with compounds containing secondary alcohol groups or "Abcite", had the secondary effect of making the exposed surface of the laceration shield relatively nonadhereable. This was an advantage in the laminating procedure described above, because it made it unnecessary to treat the bent glass cover sheet with a releasee agent before placing it over the applied plastic sheets. However, it also presented an inherent disadvantage when the windshield came to be mounted in an automobile. Thus, the exposed surface of the layer 18 exhibited extremely poor adhesion to the polysulfide mastic sealant ("Thiokol") commonly used, as indicated at 20 in FIGS. 3 and 4, in mounting and sealing windshields into the conventional frame 21 therefor.

Nevertheless, when the marginal portions of the exposed surface of the layer 18 was treated with a solution of one of the adhesion promoters or primers of this invention, as indicated at 22, the windshield 10 was satisfactorily mounted and adhesion was obtained between the layer 18 of the windshield and the body 20 of mastic sealant that was equal or superior to that obtained between the sealant 20 and the glass sheet 13 and continued during field exposure and subsequent removal of the windshield for testing.

Similarly, with some combinations of layer materials in a multi-layer shield according to the invention the layer 18 may be nonadherent or not adequately adherent to the layer 17. For example, this becomes a problem when the layer 18 is an hydrolysis and condensation product of a silane, but can be overcome by applying an adhesion promotor, as a primer, to the surface of the layer 17 to which the layer 18 is to be adhered. Moreover, when the adhesion promoter is applied to both surfaces of the layer 17 it also improves the adhesion of the layer 17 to the layer 16.

Specific adhesion promoters of the invention comprise the following seven only slightly related materials:

1. The reaction product of a solid epoxy resin having an epoxide equivalent of 1500 to 2000 with gamma-aminopropyltriethoxy silane.

2. The reaction product of a solid epoxy resin having an epoxide equivalent of 1550 to 2000 with N-beta (aminoethyl)-gamma-aminopropyl trimethoxy silane.

3. The reaction product of a solid epoxy resin having an epoxide equivalent of 1550 to 2000 with substituted aminoalkyltrimethoxy silane.

4. the reaction product of a liquid epoxy resin having an epoxide equivalent of 175 to 210 with N-beta (aminoethyl)-gamma-aminopropyl trimethoxy silane.

5. The reaction product of a liquid epoxy resin having an epoxide equivalent of 175 to 210 with gamma-aminopropyltriethoxy silane.

6. The reaction product of a liquid polysulphide resin with gamma-aminopropyltriethoxy silane.

7. The reaction product of a liquid polysulphide resin with tetraisopropyl titanate. Thus it will be noted that all seven of these primer systems are products of the reaction between a film forming resin and a compound capable of hydrolysis followed by condensation. However, of the seven, the resins in the first three are epoxy resins that are solid at room temperture, while those in the fourth and fifth are liquid epoxy resins, and the ones in the sixth and seventh are liquid polysulfide resins;

and, also, whereas the hydrolyzable compounds in the first six are silanes containing an amine group or, differently stated, are amino functional alkoxy silanes, that in the seventh is tetraisopropyl titanate.

In use, the resin and hydrolyzable compound of each are ordinarily first mixed together and allowed to react, after which the primer system is applied to the nonadherent surface as a solution, from which the solvent evaporates before hydrolysis takes place. The primers appearing as second and third on the list were found to function either under heat or at room temperature if given sufficient time, but hydrolysis was best under heat. Of the remainder, those listed as first, sixth and seventh functioned nearly as well at room temperature as under heat, and the rest all functioned at room temperature.

Nevertheless, and surprisingly enough, these specific ones appeared to be the only reaction products of film forming resins with compounds capable of hydrolysis followed by condensation that gave acceptable adhesion, under the rather stringent tests applied, with all types of coated "Mylar" sheeting, and with all of the "Thiokol" formulations that were tried. Although, other adhesion promoters within the generic requirements set forth, gave very satisfactory results in improving adhesion between adjacent layers in the multilayer shield of the invention.

In addition to accepted tests with windshields made in accordance with the Example, the adhesion promoting properties of the primers of the invention were further tested and found quite remarkable, not only with "Abcite" coated "Mylar" sheeting that had to be layered up with the plasticized polyvinyl butyral sheet prior to laminating as described above, but also with the polyvinyl butyral and coated "Mylar" received as a roll of composite sheeting. Similarly these primers were tested and found completely satisfactory when specifically different "Thiokol" formulations were used as the polysulfide mastic sealant.

The adhesion tests referred to were carried out by laminating the "Abcite" coated sheeting to a plate of glass, to provide a rigid substrate. A 1% solution of the adhesion promoter was then applied to the exposed "Abcite" surface. After air drying a bead of the mastic sealant about 1 ½ inches wide was laid down over the so treated or primed surface, and given a cure cycle of from 2 to 4 hours at 140° F., and/or form 16 to 20 hours at room temperature.

Adhesion was tested by pulling a tab (that had been formed at one end of the bead by placing a piece of Minnesota Mining and Manufacturing Company's 853 tape between the primed surface and the "Thiokol" mastic sealant) until adhesive failure, between the primed surface and the mastic sealant, or cohesive failure, in the sealant, occurred. Partially cohesive failure was considered as demonstrating that the strength of the bond (adhesive strength) and the tear strength of the sealant were of approximately the same order of magnitude. But adhesion was considered to be acceptable only when it was sufficient to cause purely cohesive failure in the mastic sealant, thus demonstrating that the bond strength was definitely greater than the tear strength of the sealant.

In preparing the primer systems for use in the adhesion tests described above, it was done with those listed as 1,2,3, 6 and 7 on the list by dissolving 0.9 of a gram of the resin in 90 ml. of cellosolve, then making a solution of 0.5 grams of the hydrolyzable compound (silane or titanate) in 50 ml. of benzene, and finally adding 10 ml. of the primer solution to the resin solution; and, as an alternative procedure, by dissolving 0.9 of a gram of the resin in 90 ml. of cellosolve, and adding it to a 10 ml. aliquot of 0.5 of a gram of the hydrolyzable primer (silane or titanate) in 50 ml. of benzene.

For 4 and 5 it was done by dissolving 0.9 of a gram of the resin in 10 ml. of cellosolve and 80 ml. of toluene, then dissolving 0.5 of a gram of the hydrolyzable silane primer in 50 ml. of toluene, and adding 10 ml. of the latter solution to the first.

For preparing the system of 6, a liquid polysulfide having a molecular weight oof 1000 was used; and, for 7, one having a molecular weight of 4000.

However it is to be understood that the forms of the invention herein shown and described are to be taken as preferred embodiments only of the same, and that various changes in the size, shape, and arrangement of parts, as well as various proportional, compositional and procedural changes, may be resorted to without departing from the spirit of the invention as defined in the following claims.

We claim:

1. A transparent, temperature stable, glazing structure for automobiles that is free of apparent distortion and birefringence color; comprising the combination, with a surface of glass that is to become the inboard glass surface when said glazing structure is mounted in an automobile, of a relatively soft and extensible penetration resistant protective plastic cover on said surface that includes a layer of relatively high adhesion plastic selected from the group consisting of polyvinyl butyral, ionomer resin, polyurethane and polyvinyl chloride, heat and pressure laminated to said inboard glass surface of said structure, a more durable layer of stretched plastic selected from the group consisting of polyethylene terephthalate, polyurethane, cellulose triacetate, fluorinated copolymers of ethylene and propylene, copolymers of acrylic acid esters, and polyvinyl fluoride arranged with its major axis of stretch at right angles to the horizontal dimension of said glazing structure on said relatively high adhesion plastic layer, and a relatively harder abrasion resistant coating layer ½ to 14 mils thick selected from the group consisting of (a) mixtures of polysilicic acid and copolymers of fluorinated monomers with compounds containing alcohol groups, (b) hydrolysis and condensation products of methyltriethoxy silane and (c) a mixture of hydrolysis and condensation products of methyltriethoxy silane and polysilicic acid on said more durable layer of stretched plastic; and an adhesion promoter comprising a solution of a reaction product of a film forming resin with a compound capable of hydrolysis followed by condensation on a surface of one of said last mentioned layers.

2. A glazing structure as defined in claim 1, in which said compound capable of hydrolysis followed by condensation is a silane.

3. A glazing structure as defined in claim 2, in which said compound capable of hydrolysis followed by condensation is a silane containing an amine group.

4. An adhesion promoter as defined in claim 3, in which said compound is gamma-aminopropyltriethoxy silane.

5. A glazing structure as defined in claim 1 in which said film forming resin in said adhesion promoter is an epoxy resin.

6. A glazing structure as defined in claim 1, in which said film forming resin is a liquid polysulfide.

7. A glazing structure as defined in claim 1, in which said abrasion resistant layer is a mixture of polysilicic acid and copolymers of fluorinated monomers with compounds containing secondary alcohol groups, and said adhesion promoter is a material selected from the group consisting of the reaction product of a solid epoxy resin having an epoxide equivalent of 1550 to 2000 with gamma-amino-propyltriethoxy silane, the reaction product of a solid epoxy resin having an epoxide equivalent of 1550 to 2000 with N-beta (aminoethyl)-gamma-aminopropyl trimethoxy silane, the reaction product of a solid epoxy resin having an epoxide equivalent of 1550 to 2000 with substituted aminoalkyl-trimethoxy silane, the reaction product of a liquid epoxy resin having an epoxide equivalent of 175 to 210 with N-beta (aminoethyl)-gamma-aminopropyl trimethoxy silane, the reaction product of a liquid epoxy resin having an epoxide equivalent of 175 to 210 with gamma-aminopropyl-triethoxy silane, the reaction product of a liquid polysulphide resin with gamma-aminopropyltriethoxy silane, and the reaction product of a liquid polysulphide with tetraisopropyl titanate on the exposed surface of said abrasion resistant layer.

8. A glazing structure as defined in claim 1, in which said layer of relatively high adhesion plastic is polyvinyl butyral, said more durable layer of stretched plastic is polyethylene terephthalate, said relatively harder abrasion resistant coating layer is a mixture of polysilicic acid and copolymers of fluorinated monomers with compounds containing alcohol groups, and said adhesion promoter is the reaction product of a solid epoxy resin having an epoxide equivalent of 1550 to 2000 with N-beta (aminoethyl)-gamma-aminopropyl trimethoxy silane.

9. A glazing structure as defined in claim 8, in which said surface of glass is a surface on a laminated glass unit that includes two sheets of glass from 0.085 inches to 0.110 inches thick and an interlayer of plastic from 0.015 to 0.060 inches thick, said layer of polyethylene terephthalate is between 5 and 10 mils thick, the combined thicknesses of said layer of polyvinyl butyral and said interlayer of plastic does not exceed 0.065 inches , and the combined thicknesses of said interlayer of plastic said layer of polyvinyl butyral and said layer of polyethylene terephthalate does not exceed 0.075 inches .

10. A method of sealing a glazing structure, having an exposed surface of a mixture of polysilicic acid and copolymers of fluorinated monomers with compounds containing secondary alcohol groups, in a frame with a polysulfide mastic as the adhesive; comprising applying an adhesion promoting material selected from the group consisting of the reaction product of a solid epoxy resin having an epoxide equivalent of 1550 to 2000 with gamma-aminopropyltriethoxy silane, the reaction product of a solid epoxy resin having an epoxide equivalent of 1550 to 2000 with N-beta (aminoethyl)-gamma-aminopropyl trimethoxy silane, the reaction product of a solid epoxy resin having an epoxide equivalent of 1550 to 2000 with substituted aminoalkyltrimethoxy silane, the reaction product of a liquid epoxy resin having an epoxide equivalent of 175 to 210 with N-beta (aminoethyl)-gamma-aminopropyl trimethoxy silane, the reaction product of a liquid epoxy resin having an epoxide equivalent of 175 to 210 with gamma-aminopropyltriethoxy silane, the reaction product of a liquid polysulphide resin with gamma-aminopropyltriethoxy silane, and the reaction product of a liquid polysulphide with tetraisopropyl titanate, to areas of said exposed surface that are to be in contact with said mastic, and then sealing said structure in said frame.

11. A method as defined in claim 10, in which the resin and hydrolyzable compound of the selected adhesion promoting material are first mixed and allowed to react, said adhesion promoting material is applied as a solution of the resulting reaction product in a solvent having a minimal reaction with said exposed surface and said adhesion promoting material, and the solvent evaporates and hydrolysis takes place after said application.

* * * * *

UNITED STATES PATENT AND TRADEMARK OFFICE
CERTIFICATE OF CORRECTION

PATENT NO. : 4,059,469

DATED : November 22, 1977

INVENTOR(S) : Paul T. Mattimoe et al

It is certified that error appears in the above-identified patent and that said Letters Patent are hereby corrected as shown below:

```
Col. 1, lines 7 & 8, "conntinuation" should be --continuation--
Col. 1, line 58,     "simmple" should be --simple--
Col. 2, lines 13 & 14, "sutiable" should be --suitable--
Col. 2, line 47,     "persepctive" should be --perspective--
Col. 2, line 49,     "shiled" should be --shield--
Col. 3, line 37,     after "1/8" insert --"--
Col. 3, line 65,     "Abciter" should be --Abcite--
Col. 6, line 44,     "1500" should be --1550--
Col. 7, line 47,     "form" should be --from--
Col. 8, line 13,     "oof" should be --of--
```

Signed and Sealed this

Seventh Day of March 1978

[SEAL]

Attest:

RUTH C. MASON
Attesting Officer

LUTRELLE F. PARKER
Acting Commissioner of Patents and Trademarks

UNITED STATES PATENT AND TRADEMARK OFFICE
CERTIFICATE OF CORRECTION

PATENT NO.  : 4,059,469
DATED       : November 22, 1977
INVENTOR(S) : Paul T. Mattimoe et al It is certified that error appears in the above-identified patent and that said Letters Patent are hereby corrected as shown below:

Column 8, line 35, after "layer" insert --1/2 to 14 mils thick--.
Column 8, lines 43 and 44, cancel "1/2 to 14 mils thick".

Signed and Sealed this

Eighth Day of April 1980

[SEAL]

*Attest:*

SIDNEY A. DIAMOND

*Attesting Officer*  *Commissioner of Patents and Trademarks*